Aug. 15, 1950 T. H. COE, JR 2,519,226
HYDRAULIC KNEE JOINT FOR ARTIFICIAL LEGS OR LEG BRACES
Filed Jan. 12, 1948 3 Sheets-Sheet 1

INVENTOR.
Thomas H. Coe, Jr.,
BY Victor J. Evans & Co.
ATTORNEYS

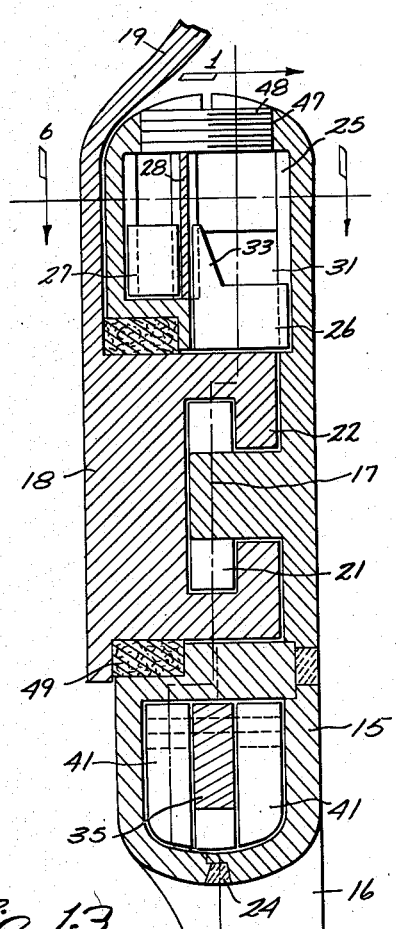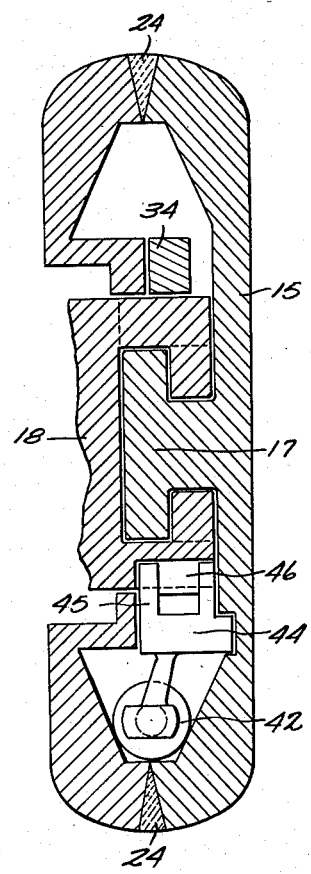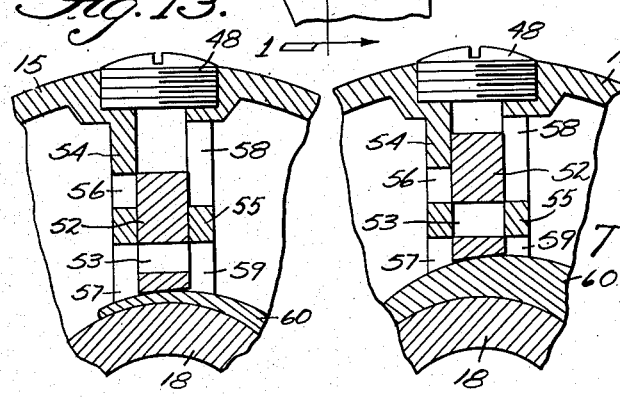

Aug. 15, 1950 T. H. COE, JR 2,519,226
HYDRAULIC KNEE JOINT FOR ARTIFICIAL LEGS OR LEG BRACES
Filed Jan. 12, 1948 3 Sheets-Sheet 3
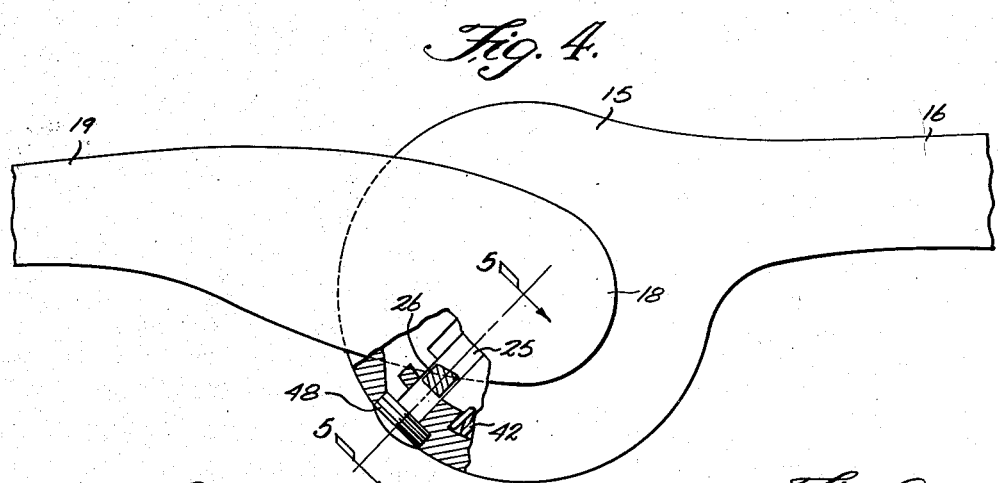
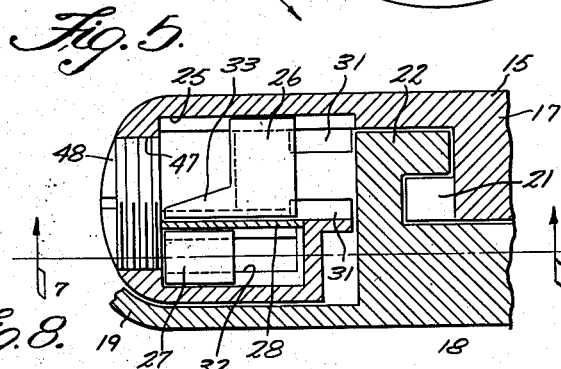
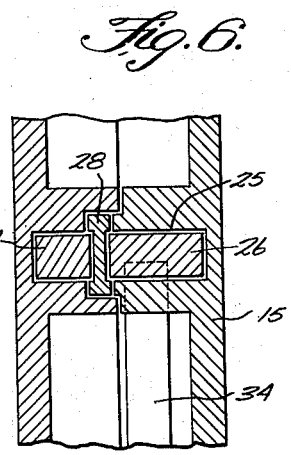
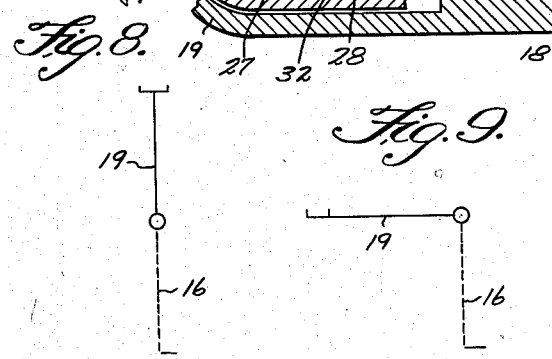
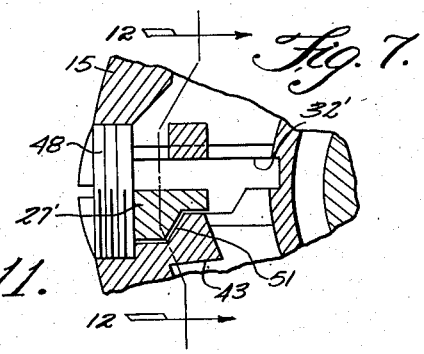
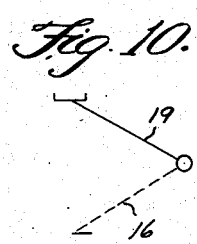
INVENTOR.
Thomas H. Coe, Jr.,
BY Victor J. Evans & Co.
ATTORNEYS Patented Aug. 15, 1950

2,519,226

UNITED STATES PATENT OFFICE 2,519,226

HYDRAULIC KNEE JOINT FOR ARTIFICIAL LEGS OR LEG BRACES

Thomas H. Coe, Jr., Lakeville, Conn.

Application January 12, 1948, Serial No. 1,865

4 Claims. (Cl. 188—93)

This invention relates to a hydraulic knee joint for artificial legs or leg braces.

It is an object of the present invention to provide a flexible support for disabled persons which will give resistance to movement of the parts of the support when the limbs or legs are being bent at rates of speed which may be regulated so as to be different at different portions of the descent.

Other objects of the present invention are to provide a joint for an artificial leg or leg brace which is of smooth action, free of locks and catches, wherein all of the mechanism is confined within a housing and sealed in a lubricant, which is free of gears, screws and the like, compact, sturdy, adapted to assume large loads, easy to assemble, simple in construction, inexpensive to manufacture, which will permit a free and natural step, and efficient in operation.

For a better understanding of the invention, reference may be had to the following detailed description taken in connection with the accompanying drawing, in which Fig. 1 is a transverse sectional view taken through the knee joint of the present invention and generally on line 1—1 of Fig. 2, Fig. 2 is a sectional view, in elevation, taken on line 2—2 of Fig. 1, Fig. 3 is a sectional view of the joint taken on line 3—3 of Fig. 1, Fig. 4 is a side elevational view of the joint showing the arm portions extending therefrom and with portions broken away to show the throttle valve arrangement, Fig. 5 is an enlarged sectional view taken through the throttle valve arrangement and on line 5—5 of Fig. 4, Fig. 6 is a fragmentary sectional view taken on line 6—6 of Fig. 2, Fig. 7 is a sectional view of a modified form of valve arrangement as would be noted along a line 7—7 of Fig. 5, Figs. 8, 9, 10 and 11 illustrate respectively the standing, sitting, stooping or stepping, and horizontal positions of the joint parts, Fig. 12 is a sectional view of the modified form of the invention and taken on line 12—12 of Fig. 7, Fig. 13 is a detail illustrating a modification of the throttle valve wherein a single plate is used, the section being taken in a plane similar to that of Figure 7.

Fig. 14 is a view similar to that shown in Figure 13, with the valve plate shown in the closed position.

Figure 15:
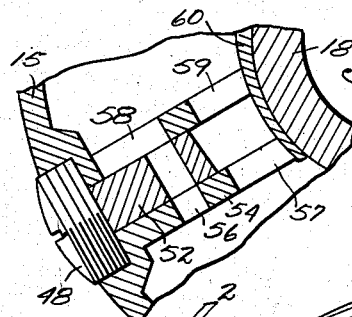
Fig. 15 is a similar detail illustrating the parts in the full open position.
Figure 16:
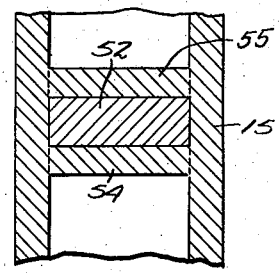
Fig. 16 is a sectional plan similar to that shown in Figure 6, showing the valve mounting as illustrated in Figures 13 to 16.

Referring now to the figures, 15 represents a housing which may be of the shape shown as when the knee joint of the present invention is to be used with leg braces or of spherical shape when forming a part of an artificial limb. Extending from the housing is an arm 16 which will extend along the lower leg. The housing has at its center a projection or stud 17 to which a second joint part or hub 18 is fixed for adjustment. The housing 15 will be adjusted about the part 18. The part 18 has an arm 19 which will be connected to the upper leg or may form the upper leg part of an artificial limb. The projection 17 has diametrically opposite slots 21, Figure 2, for receiving projections 22 of the part 18 whereby to retain the parts against lateral displacement from one another when the projections 22 are angularly displaced from the slots 21 in the projections 17.

The housing 15 is formed of portions welded together at their peripheries as indicated at 24. At one side of the housing 15 are fixed guide portions 25 in which move plates 26 and 27 separated from one another by a partition 28. These plates serve as closures for apertures 31 and 32. The plate 26 has a portion 33, Figure 2, which extends over the opening 31 when the plate 26 is in its lowered position.

Within the housing 15 is an assemblage comprising a cam 34 and a piston 35. The cam 34 will operate beneath the plate 26 to lift the same when the housing 15 rotates with respect to the part 18. The cam will accordingly cause plate 26 to charge the opening 31 to throttle the liquid forced toward the opening 31 to a greater extent as piston 35 travels within the housing 15. The cam 34 has a radially-inwardly extending portion 36 which enters a recess of the part 18. The cam 34 is accordingly actuated by the part 18.

The piston 35 is of arcuate shape and is adapted to travel within the housing 15. It has a shoulder 37 adapted to engage a stop portion 38 of the housing to limit its movement in one direction. Its movement in the opposite direction is limited by an adjustable set screw 39. The piston 35 has hinged flap 41 which is moved to an open position as the piston is returned toward the set screw.

Also within the housing 15 is a spring 42 acting between a shoulder 43 of the housing 15 and an arm 44 pivoted on the housing and adapted to be actuated by the part 18, the arm having an extension 45 within a recess 46 in the part 18.

Assuming the body of the person is lowered from a position shown in Figure 8 to positions shown in Figure 9 and Figure 10, the resistance to control the rate of descent is effected by raising of plate 26 over the opening 31 whereby to cause resistance to the flow of liquid through the housing from piston 35 to the opposite side of opening 31 and when the flap 41 is closed. The cam 34 and the piston 35 are free to rotate clockwise when the parts are extended from either of the positions shown in Figures 9 and 10 to the position shown in Figure 8.

It will be apparent that the parts of this knee joint will vary accordingly to the size of the person to make use of the same. One way to adjust the joint to a different weight person is to use a plate 26 with a different shape or size of portion 25 or to change the size of the aperture 31. Access is had to the plates 26 and 27 through a threaded opening 47 in the housing 15 which is normally closed by a screw plug 48. Likewise the shape of the cam 34 may be varied. If it was found necessary to have rapid closing of the opening 31 for the first few degrees it may be effected by having the first part of the cam provided with a fast surface.

The arrangement makes full use of friction to resist movement of the parts relative to one another. Gasket 49 is provided between the parts to prevent leakage of oil or other liquid within the housing and will provide a frictional connection between the parts to resist their movement relative to one another.

Where the leg is extended as shown in Figure 11 as when the wearer is on the ground and desires to rise, it is desirable that the lower leg be brought easily to a vertical position. This action is the same as bending the knee except that the weight for operating the same lies only in the lower leg. This weight is only a small part of the weight of the body of the wearer hence the speed of flexure may be less. In order to provide for this situation means has been provided to increase the speed of action under the circumstances.

Figure 1:
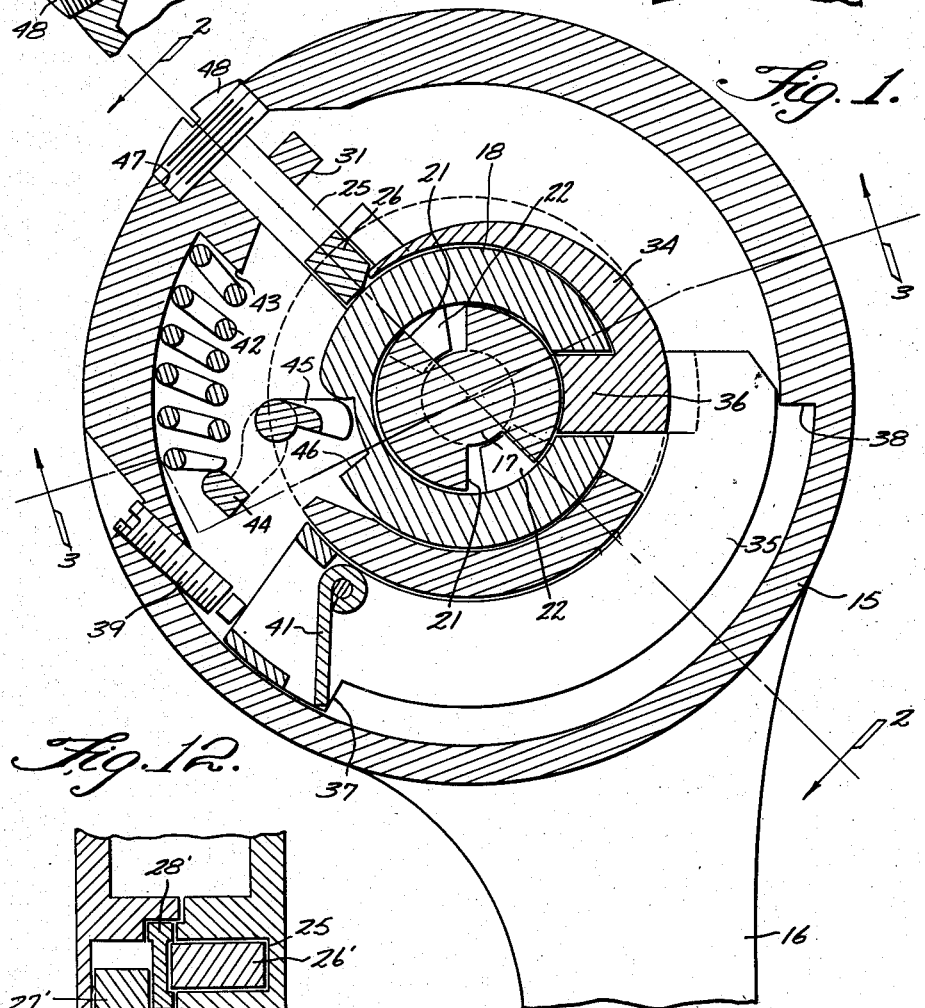

Referring to Figure 1, it will be noted that the guides 25 for the plates 26 and 27 extend at a forty-five degree angle. Thus the plates 26 and 27 are free to move under the pull of gravity if the joint is turned so that the plates may drop. As shown in Figure 5 the openings 31 and 32 are fully opened. As the lower leg moves toward the vertical the opening 31 is closed slowly by the cam 34 and by the plate 26 falling by gravity at a point somewhat below the forty-five degree angle. The opening 32 will also be closed by the plate 27 falling by gravity. The plate 27 and opening 32 are supplementary to plate 26 and opening 31. The length of the plate 27 may be used to control the size of the opening 32.

Figure 12:
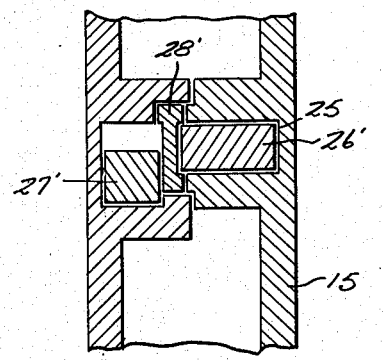

In Figure 7 and 12, there is shown a design where supplementary plate 27' is delayed in its closure movement upon the lower leg being brought to the vertical position. The plate 27' is retained by the inclined shoulder 51 before finally dropping over the lower part of opening 32'. A partition 28', similar to the partition 28 shown in Figure 6, is positioned between the plates 26' and 27', the plate 26' being similar to the plate 26, and adapted to close the opening 31' as shown in Figure 12.

In the foregoing designs apertures of maximum size have been provided as may be required for relatively light weight users, wherein the throttle valve and the large apertures required two sliding plates. It is also possible to use a single plate or valve element as illustrated in Figures 13 to 16 wherein a valve 52 with an aperture 53 therethrough is slidably mounted between the guides 54 and 55 with apertures 56 and 57 in the guide 54, and 58 and 59 in the guide 55. In this design a cam 60 similar to the cam 34 actuates the valve 52 from the position shown in Figure 13, in which the leg is straight and vertical, to the position shown in Figure 14, in which the knee is bent to the maximum, and all apertures are closed. In Figure 13 the inner apertures 57 and 59 are open through the aperture 53, and in Figure 15, where the lower leg is horizontal and the valve has dropped by gravity all apertures are fully open. By this arrangement much smaller apertures may be provided, and it will be understood that one or a plurality of throttle valves or plates may be used as may be desired.

The spring is compressed by the end of the lever 44 that is mounted with the end 45 positioned in the recess 46, as shown in Figure 1, wherein the spring 42 holds the part 18 in relation to the part 15 through the lever 44. Resistance is accordingly provided upon a slight movement of one part relative to the other inasmuch as the recess 46 is short. Although the spring provides ease of movement between the parts it is not essential to the operation of the joint and may be omitted.

It will be understood that other changes may be made in the design and arrangement of the parts without departing from the spirit of the invention.

What is claimed is:

1. A hydraulic knee joint for artificial legs and leg braces comprising a housing having a center projection and an arm extending therefrom, a second part locked with the center projection of the housing against lateral displacement therefrom while permitting relative rotation between the parts, an arcuate piston operable through the housing to force the liquid in one direction, a throttle valve arrangement for controlling the flow of liquid being delivered by the piston, and means operable between the housing and the part for controlling the throttle valve arrangement, said means for operating the throttle valve comprising a cam, said throttle valve including a plate and said cam operable beneath the plate to operate the same as the housing is angled relative to the part.

2. A hydraulic knee joint for artificial legs and leg braces comprising a housing having a center projection and an arm extending therefrom, a second part locked with the center projection of the housing against lateral displacement therefrom while permitting relative rotation between the parts, an arcuate piston operable through the housing to force the liquid in one direction, a throttle valve arrangement for controlling the flow of liquid being delivered by the piston, and means operable between the housing and the part for controlling the throttle valve arrangement, said throttle valve arrangement including guide portions extending from the housing, two plates for controlling respectively two openings, one opening supplementing the other opening, a partition disposed between the plates, and an opening in said housing through which these plates may be removed and replaced, said means for operating the throttle arrangement being operable from only one of the plates, said throttle valve arrangement extending at an angle of forty-five degrees whereby to permit free initial movement of the housing part when brought from a horizontal position toward a vertical position.

3. A hydraulic knee joint for artificial legs and leg braces comprising a housing having a center projection and an arm extending therefrom, a second part locked with the center projection of the housing against lateral displacement therefrom while permitting relative rotation between the parts, an arcuate piston operable through the housing to force the liquid in one direction, a throttle valve arrangement for controlling the flow of liquid being delivered by the piston, and means operable between the housing and the part for controlling the throttle valve arrangement, said throttle valve arrangement including two valve plates one of which has an inclined shoulder, said housing having guide portions with a complementary inclined shoulder for delaying the movement of the valve plate until a predetermined angular position of the housing has been established and such that gravity action upon the plate will be delayed.

4. In a hydraulically controlled knee joint, the combination which comprises a substantially flat cylindrical housing having a centrally disposed stud and having a leg mounting arm extended therefrom, a hub extended into said housing, pivotally mounted on said stud and also having a leg mounting arm extended therefrom, said hub having a piston extended therefrom and positioned in the housing, valve means in the housing restricting flow of fluid actuated by the piston of the hub, means adjusting the position of the said valve means as the hub is rotated in the housing, and means releasing the fluid in the housing for the return movement of the piston and hub.

THOMAS H. COE, Jr.

REFERENCES CITED

The following references are of record in the file of this patent:

UNITED STATES PATENTS

| Number | Name | Date |
|---|---|---|
| 1,587,207 | Ackerman et al. | June 1, 1926 |
| 1,675,760 | Manzel | July 3, 1928 |